March 4, 1969 — R. E. ROSS — 3,431,095
GLASS BENDING FURNACE
Filed Nov. 24, 1965 — Sheet 1 of 3

INVENTOR.
Robert E. Ross
BY
Nobbe & Swope
ATTORNEYS

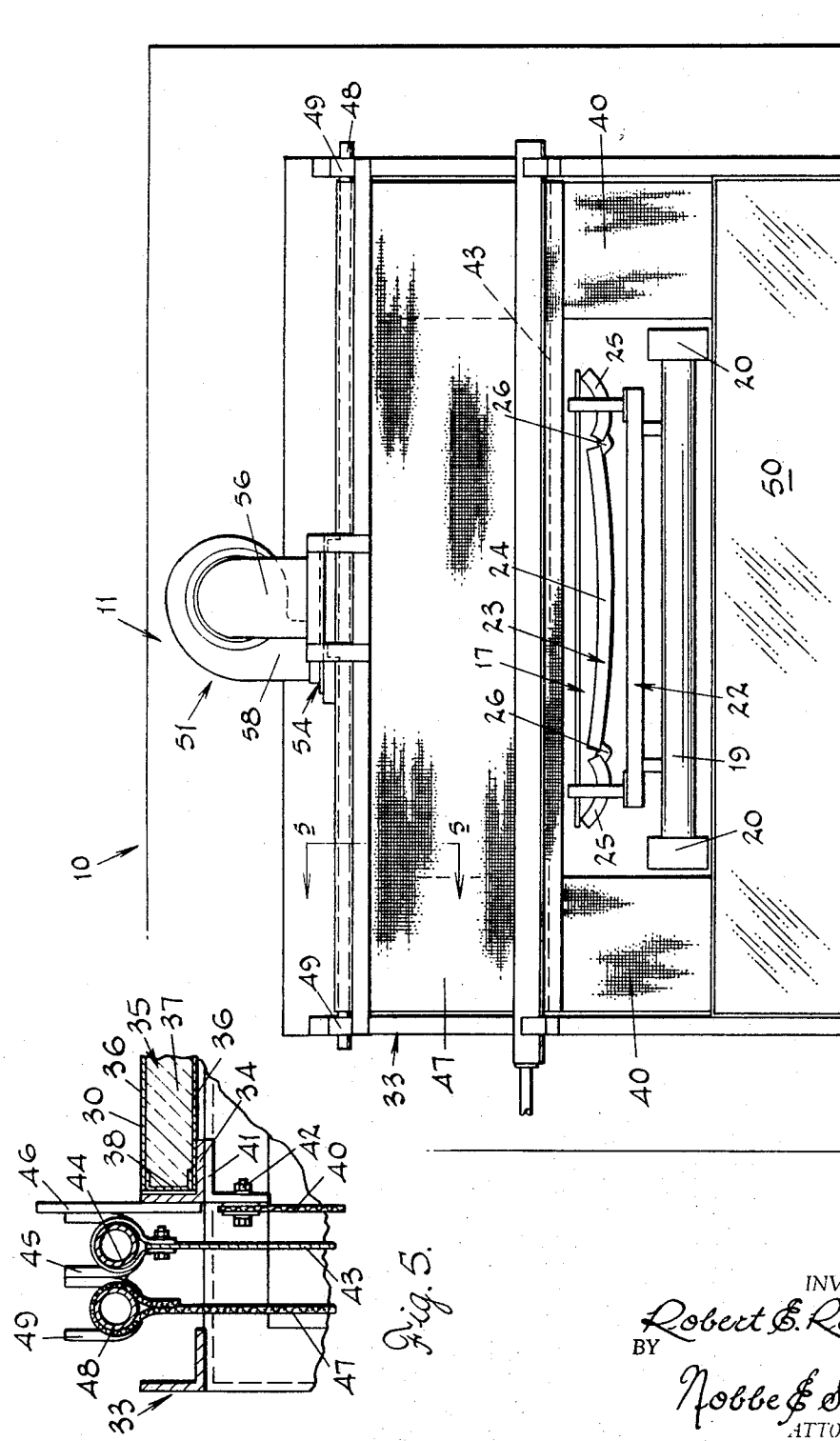

INVENTOR.
Robert E. Ross
BY
Nobbe & Swope
ATTORNEYS

United States Patent Office 3,431,095
Patented Mar. 4, 1969

3,431,095
GLASS BENDING FURNACE
Robert E. Ross, Toledo, Ohio, assignor to Libbey-Owens-Ford Glass Company, Toledo, Ohio, a corporation of Ohio
Filed Nov. 24, 1965, Ser. No. 509,559
U.S. Cl. 65—274                                    2 Claims
Int. Cl. C03b 23/02, 29/00

ABSTRACT OF THE DISCLOSURE

A furnace for bending glass sheets which includes a heating chamber, a doghouse chamber, and an additional preheat chamber communicating with the entrance end of the doghouse chamber. A fan and associated ducts are provided to recirculate the atmosphere within the preheat chamber and the recirculation flow draws heated air from the heating chamber through the doghouse chamber and in so doing forces the heated air to flow beneath sheets as they are conveyed through the furnace.

---

This invention relates broadly to heat-treating furnaces and more particularly to improved method and apparatus for heating glass sheets or plates in a bending operation.

In the bending of glass sheets or plates, it is customary to use peripheral or skeleton type bending molds which have shaping surfaces formed thereon conforming in outline to the configuration of the sheets when bent. Flat glass sheets are supported on these molds and passed through a furnace having a heated chamber wherein the sheets are progressively heated to substantially the softening point of the glass and caused to sag under the influence of gravity to conform to the shaping surface of the mold.

In the production of windshields for present-day automobiles, it is standard practice to produce a laminated unit having two glass sheets bonded together by an interlayer, and the recent trends in automobile styling requires severe curvatures or bends in the glass sheets which are determined by the styling of the automobile.

In bending glass sheets to be used for producing laminated windshields, it is extremely important that the curvature of the pair of sheets is substantially identical to produce a laminated unit which will be commercially acceptable. It has been found that the most efficient manner for bending glass sheets for laminated windshields is to bend both of the glass sheets at the same time so that the curvature of each of the pairs of sheets will be substantially identical. It has also been determined to be particularly advantageous, when bending a pair of superimposed glass sheets, to provide more heat to the uppermost sheet during the entire bending operation, for if the lowermost sheet is a higher temperature it will bend away from the uppermost sheet to produce a different degree of curvature thereby rendering the final sheets unacceptable.

A bending furnace for this purpose usually includes a tunnel-type heating chamber having entrance and exit ends with a doghouse chamber adjacent the entrance end. A series of radiant burners are located along the length of the top and side walls of the heating chamber to raise the temperature of the glass sheets passed therethrough to the softening point of glass. The major portion of the heat produced in this type of furnace is supplied by the radiating heat currents from the burners located in the top wall or roof with the side wall burners merely supplying heat to the furnace atmosphere beneath the sheet to prevent the furnace from becoming cold in this area and also cause the furnace bottom and side walls to radiate secondary heat upwardly to the undersurface of the glass sheet to be bent.

In order to eliminate a large temperature diferential between the heated chamber and the glass sheets to be bent, the radiant burners are controlled to provide zones of increasing temperature from the entrance end to the exit end of the bending furnace to thereby provide a heat pattern which will be at slightly above room temperature at the entrance end of the furnace and progressively rise to a temperature corresponding to the softening point of the glass adjacent the exit end of the furnace. It has been found that this arrangement will considerably reduce breakage caused by thermal shock when the glass sheets are passed into a highly heated atmosphere.

However, this type of furnace has presented problems in providing sufficient heat at the entrance area of the furnace to the undersurface of the lowermost or bottom sheet when bending a pair of glass sheets for use in a windshield.

Although it is desirable to provide more heat above the glass sheets in the heating chamber some heat must also be provided to the lowermost sheet to prevent thermal shock causing breakage. In furnaces of the above type, it has been found to be difficult, if not impossible, to produce a heated atmosphere at the entrance end of the heating chamber which will raise the temperature of both the top and bottom sheets. This is because the heated atmosphere tends to shift towards the roof of the furnace leaving an area, particularly at the entrance end of the heating chamber, adjacent the conveyor rolls, at substantially room temperature.

The primary object of the invention is to provide improved method and apparatus for increasing the efficiency of glass bending furnaces.

Another object is to provide improved method of producing better distribution of the heated atmosphere in a bending furnace to more uniformly heat glass sheets in a bending operation.

A further object is to produce better distribution of heated atmosphere adjacent the entrance end of a bending furnace by drawing heated gases from the heated chamber to a doghouse chamber.

A still further object is ot provide apparatus for performing the above method in which means are provided for better distribution of the heated atmosphere in a bending furnace by drawing and circulating the heated gases from the heated chamber to a chamber adjacent the entrance end thereof to preheat the sheets prior to entry into the heating chamber of the furnace.

Other objects and advantages of the invention will become more apparent during the course of the following description when read in connection with the accompanying drawings.

In the drawings, wherein like numerals are employed to designate like parts throughout the same:

FIG. 4 is an end elevational view of the furnace shown in FIG. 1;

FIG. 5 is a detailed sectional view taken along lines 5—5 of FIG. 4;

Figure 1:
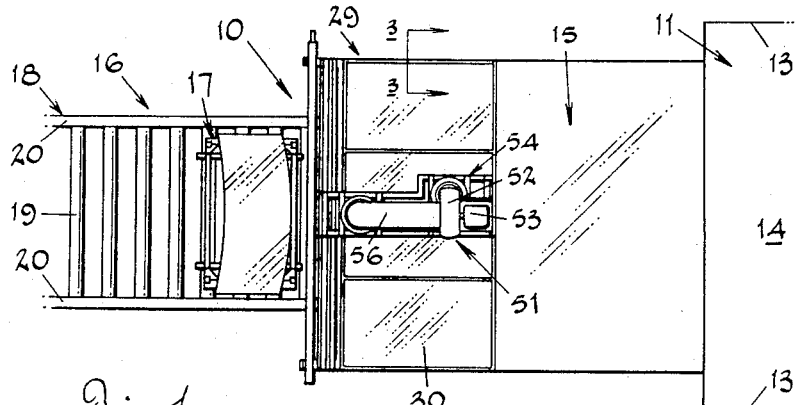
FIG. 1 is a fragmentary plan view of a bending furnace having the novel features of the present invention incorporated therein.

Referring now to FIG. 1 of the drawings, a tunnel-type glass bending furnace having the novel features of the present invention incorporated therein is designated in its entirety by the numeral 10. The furnace 10 comprises an elongated heating chamber 11 which is defined by a bottom wall 12, side walls 13 and a top wall 14, respectively; all formed of a suitable heat insulating material. The furnace also includes a doghouse chamber 15 which is in open communication with the entrance end of the heating chamber 11 and is provided with a loading station 16 adjacent the entrance end thereof.

Figure 2:
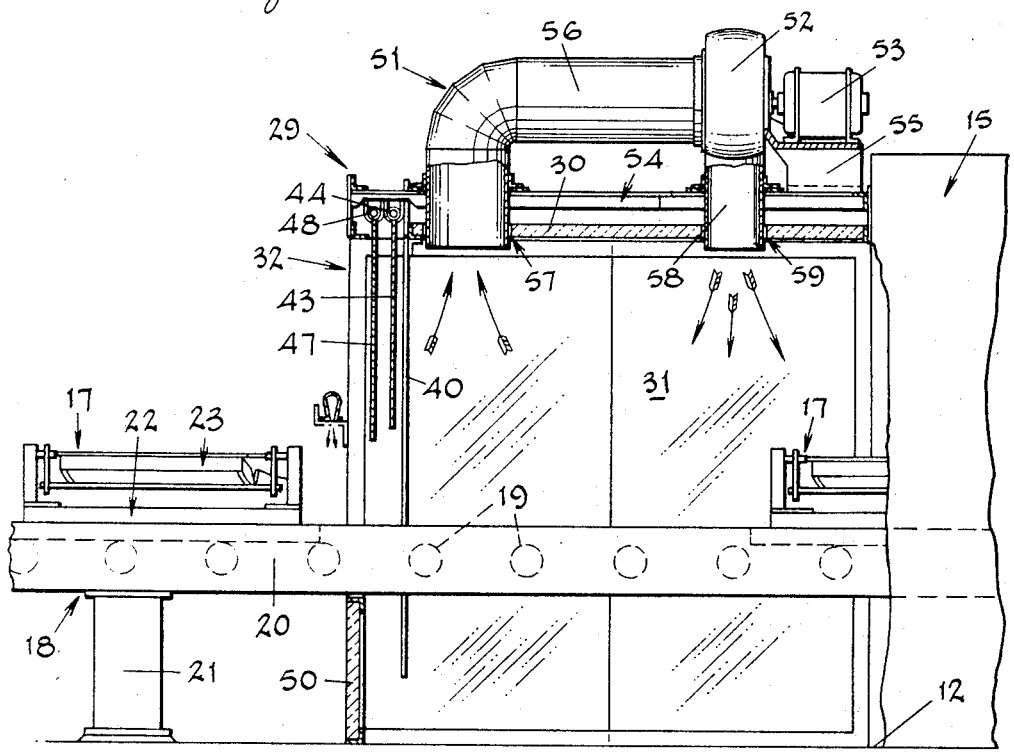
FIG. 2 is a side elevational view partially in section of the furnace shown in FIG. 1.

The glass sheets to be bent are supported upon a bending apparatus 17 which is supported and carried through the heating chamber of the furnace by a substantially horizontally disposed conveyor 18. As shown in FIGS. 1 and 2, the conveyor includes a plurality of rolls 19 with opposite ends of each roll journaled in members 20 supported upon pedestals 21 at the entrance end of the furnace with the members extending longitudinally through the heating chamber and spaced from the bottom wall thereof. The conveyor is driven by a power source (not shown) to pass the bending apparatus through the heating chamber.

As shown in FIG. 4, the bending apparatus, by way of example, comprises a rack 22 which carries an articulated, peripheral bending mold 23 including a center section 24 and end sections 25 which are movably connected to the opposite ends of the center section by suitable means, such as hinges 26.

In establishing a heating pattern within the heating chamber to gradually raise the temperature of the glass sheets to substantially the softening point of the glass, heat sources, such as radiant burners 27, are arranged in the top wall to direct radiant heat currents downwardly towards the glass sheets as they are passed through the heating chamber. Similar radiant burners 28 are located along and in the side walls of the heating chamber between the bottom wall and the roll conveyor. The burners in the heating chamber are controlled to produce a progressively increasing heat gradient from the entrance to the exit end of the heating chamber to progressively raise the temperature of the glass sheets moving therethrough to the softening point of the glass. In this manner, as the glass sheets are carried through the chamber, they become heated to a softened condition so as to bend downwardly by gravity onto the shaping surfaces of the bending mold.

During the passage of the mold through the furnace, it is of course desirable to provide more heat to the top sheet but some heat must also be provided to the bottom sheet supported on the bending apparatus. However, as indicated above, this has heretofore presented a problem particularly in the doghouse area and the entrance end of the heating chamber because of the tendency for the heated atmosphere to rise towards the top wall of the furnace.

Figure 7:
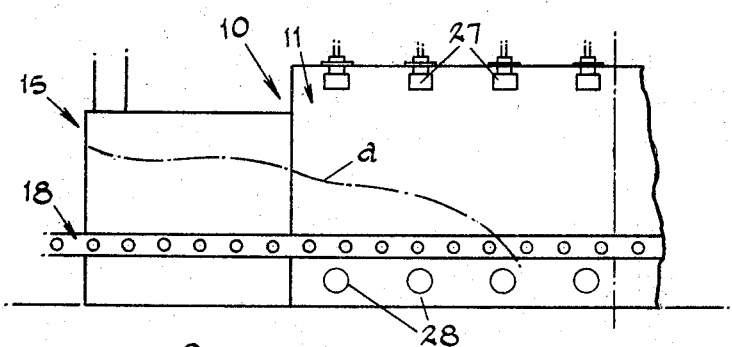
FIG. 7 is a diagrammatic view showing the heat current pattern of a prior art bending furnace.

Temperature measurements have shown that the atmosphere in a portion of the first zone, i.e., the zone adjacent the doghouse chamber, of the heating chamber and the doghouse chamber is at substantially room temperature below the line designated by the letter $a$ in FIG. 7. It has further been determined that when the temperature differential of the heated atmosphere follows this pattern the temperature of the glass does not rise until the sheets are moved past the middle of the first zone. Therefore, the temperature of the top glass sheet is raised rather rapidly at this point not only from the heated atmosphere but also from the radiating heat currents produced by the burners in the top wall of the heating chamber.

Although, as mentioned above, it is desirable to have the temperature of the top sheet slightly higher than the bottom sheet, the large increase in temperature of the top sheet caused by the combined action of the heated atmosphere and the radiated heat currents has resulted in producing a substantial temperature difference between the top and bottom sheets. This temperature difference between the sheets has caused considerable amount of breakage of the bottom sheet at the entrance end of the heating chamber.

To minimize, if not eliminate, these objections, the present invention contemplates increasing the efficiency of a bending furnace by distributing the heated atmosphere at the entrance end of the heating chamber. This is accomplished by drawing the heated atmosphere or gases from the heating chamber of the furnace into the doghouse chamber and distributing the heat in the doghouse of a bending furnace by distributing the heated atmosphere chamber to preheat the sheets before they are moved into the heating chamber. The novel procedure will increase the output of a bending furnace without the application of additional heat in the heating chamber.

To this end, in accordance with the invention means are provided for drawing heated gases from the heating chamber and recirculating the heated gases to cause a distribution of the heated gases at the entrance end of the furnace and the doghouse chamber which forces the heated gases below the level of the conveyor to preheat the glass sheets prior to entry into the heating chamber. To further increase the efficiency of a bending furnace including the novel features of the present invention, the circulating means are preferably mounted in a separate enclosure adjacent the doghouse chamber which will provide an additional preheating area for the glass sheets prior to entry into the doghouse chamber.

The enclosure in the illustrative embodiment of the invention is provided at the entrance to the doghouse chamber and includes a second or preheat chamber 29 defined by a bottom wall, a top wall 30, side walls 31 and an end wall 32 with the opposite open end communicating with the doghouse chamber of the furnace. The enclosure includes a framework 33 comprising a plurality of angle irons 34 to form rectangular openings for each of the walls. The opening in each of the top and side walls of the second chamber are covered with insulating panels 35 which are supported by the angle irons. By way of example, the panels may include spaced metal sheets 36 having the space therebetween filled with a suitable insulating material 37 and the open ends enclosed by channel members 38.

Figure 3:
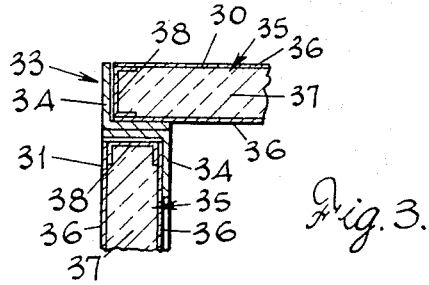
FIG. 3 is a detailed sectional view taken along lines 3—3 of FIG. 1.

As shown in FIGS. 3, 4 and 5, the end wall is partially covered by a plurality of curtains and shields suitably located to provide a restricted opening adjacent the conveyor 18 of a sufficient size to allow the bending apparatus to pass therethrough. By way of example, this shielding may include a first pair of narrow elongated fiber glass curtains 40 supported at their upper ends by the framework with suitable brackets 41 and securing devices 42 to enclose the areas located on opposite sides of the conveyor rolls. A second shield or curtain 43 of galvanized sheet metal material is suspended from a rod 44 supported at opposite ends in U-shaped brackets 45 secured to the framework 33 by means of a support plate 46 to cover the portion of the end wall above the conveyor and bending apparatus. A third curtain 47, comprising a fiber glass material suspended from a rod 48 supported at opposite ends on brackets 49 may be provided to further enclose the entrance end of the second chamber. The portion below the conveyor 18 can be enclosed with an insulated panel 50 similar to panels 35.

To effect desired heat distribution in the doghouse chamber and the entrance end of the heating chamber means 51 are provided for drawing the heated gases from the heating chamber and the doghouse chamber into the preheat chamber. The drawing means 51 may also be utilized to recirculate the drawn gases in the preheat chamber which will force the gases below the level of the conveyor in the preheat chamber to further preheat the sheets prior to entry into the furnace. The drawing means 51 includes a fan (not shown) mounted in a generally circular housing 52 and driven by a motor 53 supported above a base 54 by a support member 55. The intake of the fan is connected to the preheat chamber by a first conduit 56 extending from the housing through an opening 57 of the top wall adjacent the entrance end of the second chamber. The discharge end of the fan also communicates with the second chamber through a second conduit 58 communicating with the preheat chamber through an opening 59 located adjacent the entrance end of the doghouse chamber.

In this manner, rotation of the fan will draw heated gases towards the entrance end of the preheat chamber from the heating chamber through the doghouse chamber and the force of the fan will push the heated gases towards and below the level of the conveyor rolls extending through the preheat chamber to thereby preheat both sheets prior to entry into the doghouse chamber. This drawing and circulating action of the means or unit 51 will provide a more uniform heated atmosphere adjacent the conveyor rolls in the doghouse chamber and the entrance to the heating chamber to further preheat the sheets as they are moving through the doghouse area and into the heating chamber.

Figure 8:
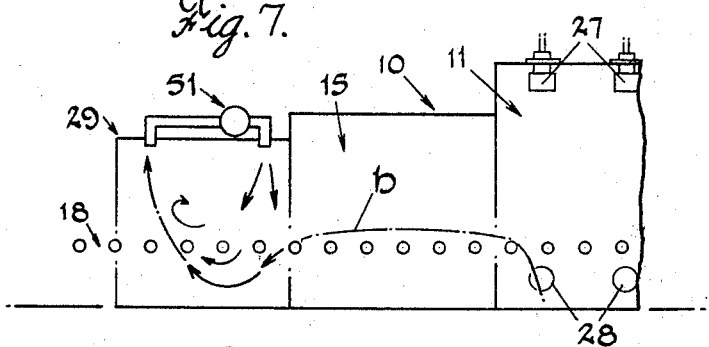
FIG. 8 is a diagrammatic view of the heat current pattern of a bending furnace constructed in accordance with the invention.

The redistribution of the heated atmosphere effected by the means or recirculating unit 51 is shown diagrammatically in FIG. 8, wherein the line designated by the letter *b* is the dividing line between substantially room temperature atmosphere and the heated atmosphere in the doghouse area and the entrance end of the heating chamber.

As can be readily appreciated, the novel arrangement provides a means for reclaiming heated atmosphere that was heretofore not utilized to preheat the glass sheets in a bending operation.

Figure 6:
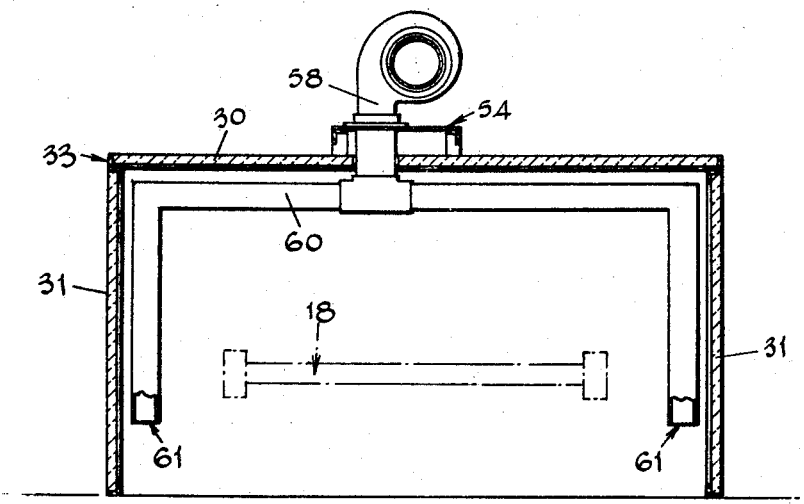
FIG. 6 is a transverse sectional view showing a modified form of the invention.

A slightly modified form of the invention is shown in FIG. 6, in which the discharge end of the recirculating unit is provided wtih a duct 60 extending transversely across the top wall and vertically downwardly along the opposite side walls of the second chamber with the bottom ends 61 of the duct being in open communication with the second chamber below the conveyor 18. This arrangement further ensures that the heated atmosphere drawn from the entrance end of the heating chamber is forced below the level of the conveyor to raise the temperature of the bottom sheet prior to entry into the heating chamber.

As can be readily appreciated, the novel arrangement set forth above provides a more efficient way to preheat glass sheets in preparation for bending with heated atmosphere which was heretofore not available for raising the temperature of the glass. Actual production runs have shown that preheating the sheets prior to entry into the furnace not only decreased the amount of breakage during the bending operation but also allows for increase in the conveyor speed through the furnace thereby producing greater yield for the furnace. Results have shown that furnace yields have increased considerably by utilizing the procedure and apparatus according to the invention.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. A furnace for bending glass sheets including a heating chamber having entrance and exit ends; means for heating the atmosphere in said chamber progressively from the entrance end to the exit end to a temperature corresponding to the softening point of the glass; a doghouse chamber communicating with the entrance end of the heating chamber; a preheat chamber communicating with the entrance end of said doghouse chamber; conveyor means extending through said chambers and being spaced above the floor thereof; said conveyor being operable to move a glass sheet supported on a bending mold along a path through said chambers; a duct disposed above said preheat chamber and having one end opening into said chamber adjacent the entrance thereof and the other end opening into said chamber adjacent the exit thereof; and a fan disposed within said duct and being operable to recirculate the atmosphere within said preheat chamber in a flow path extending from said duct downward along the exit end of said preheat chamber, beneath said conveyor from the exit to the entrance end of said chamber, and upwardly along the entrance end of said chamber and back to the opposite end of said duct, whereby a portion of the heated atmosphere within the heating chamber is drawn through said doghouse chamber beneath said conveyor and into said recirculating flow within said preheat chamber.

2. A furnace for bending glass sheets as defined in claim 1, including a duct connected to the outlet of said fan and extending downwardly into said preheat chamber between said conveyor and the side wall of said chamber and opening beneath said conveyor.

References Cited

UNITED STATES PATENTS 1,783,208    12/1930    Williams             65—119
3,248,517    4/1966    Vranken             65—107

DONALL H. SYLVESTER, *Primary Examiner.*

ARTHUR D. KELLOGG, *Assistant Examiner.*

U.S. Cl. X.R.

65—104, 107, 119, 285, 287, 350